(12) United States Patent
Schott et al.

(10) Patent No.: US 10,974,429 B2
(45) Date of Patent: Apr. 13, 2021

(54) PULL OR PUSH ROD OR A LOCKING NUT FOR A MOLDING MACHINE

(71) Applicant: ENGEL AUSTRIA GmbH, Schwertberg (AT)

(72) Inventors: Guenter Schott, St. Valentin (AT); Markus Stoeger, St. Peter in der Au (AT); Richard Czepl, St. Valentin (AT); Herbert Zeidlhofer, Haag (AT)

(73) Assignee: Engel Austria GmbH, Schwertberg (AT)

( * ) Notice: Subject to any disclaimer, the term of this patent is extended or adjusted under 35 U.S.C. 154(b) by 286 days.

(21) Appl. No.: 16/180,299

(22) Filed: Nov. 5, 2018

(65) Prior Publication Data

US 2019/0134870 A1    May 9, 2019

(30) Foreign Application Priority Data

Nov. 7, 2017    (AT) ................ A 50935/2017

(51) Int. Cl.
  *F16B 39/30*    (2006.01)
  *B29C 45/67*    (2006.01)
  *B29C 45/66*    (2006.01)

(52) U.S. Cl.
  CPC .......... *B29C 45/6714* (2013.01); *B29C 45/66* (2013.01); *B29C 45/6728* (2013.01); *F16B 39/30* (2013.01)

(58) Field of Classification Search
  CPC .......... F16B 25/00; F16B 33/00; F16B 33/02; F16B 35/007; F16B 37/002; F16B 37/04;
  (Continued)

(56) References Cited

U.S. PATENT DOCUMENTS 982,573 A * 1/1911 Cade ................ B60C 15/028
                                                 152/400
2,036,604 A * 4/1936 Pickop ................ F16B 39/30
                                                 411/308
(Continued)

FOREIGN PATENT DOCUMENTS

CH          708 049       11/2014
CN        101058122       10/2007
(Continued)

OTHER PUBLICATIONS

CAD.DE discussion Freistich and graphic, Jan. 14, 2016, https://ww3.cad.de/foren/ubb/Forum2/HTML/029169.shtml;https://ww3.cad.de/foren/ubb/uploads/sw4you/Freistich.jpg), with explanation of revelance.

(Continued)

*Primary Examiner* — Roberta S Delisle

(74) *Attorney, Agent, or Firm* — Wenderoth, Lind & Ponack, L.L.P.

(57) ABSTRACT

A pull or push rod or locking nut for a molding machine has an undercut, and the undercut has an undercut cross-section, a side wall, and an undercut ramp. The side wall transitions via a first transition curvature into an undercut base, and the undercut base transitions via a second transition curvature into the undercut ramp. The undercut base, viewed in the undercut cross-section, is at least partially curved, and the curvature of the undercut base differs from the first transition curvature and/or the second transition curvature.

25 Claims, 1 Drawing Sheet

(58) Field of Classification Search
CPC .......... F16B 39/30; F16B 41/002; B21K 1/54;
B21K 1/05; B21K 1/64; B29C 33/20;
B29C 33/202; B29C 45/66; B29C 45/671;
B29C 45/6728
USPC .............................. 411/337, 366.1; 425/589
See application file for complete search history.

(56) References Cited

U.S. PATENT DOCUMENTS

| | | | | |
|---|---|---|---|---|
| 4,583,897 | A * | 4/1986 | Briles | F16B 5/02 |
| | | | | 403/408.1 |
| 4,701,088 | A * | 10/1987 | Crull | F16B 43/001 |
| | | | | 411/369 |
| 4,799,844 | A * | 1/1989 | Chuang | F16B 33/02 |
| | | | | 411/414 |
| 4,842,466 | A * | 6/1989 | Wheeler | F16B 33/02 |
| | | | | 411/366.3 |
| 5,163,523 | A * | 11/1992 | Yousef | E21B 17/0426 |
| | | | | 175/320 |
| 7,611,311 | B2 | 11/2009 | Kakai et al. | |
| 8,221,670 | B2 | 7/2012 | Schad et al. | |
| 8,226,333 | B2 * | 7/2012 | Kakai | B23B 51/00 |
| | | | | 407/54 |
| 8,337,196 | B2 | 12/2012 | Schad et al. | |
| 2002/0172573 | A1 * | 11/2002 | Pamer | G11B 5/102 |
| | | | | 411/337 |
| 2003/0210970 | A1 * | 11/2003 | Bechtel, Jr. | B21K 1/56 |
| | | | | 411/411 |
| 2007/0071576 | A1 * | 3/2007 | Romano | F16B 35/065 |
| | | | | 411/399 |
| 2007/0248421 | A1 | 10/2007 | Kakai et al. | |
| 2010/0014928 | A1 | 1/2010 | Kakai et al. | |
| 2011/0233823 | A1 | 9/2011 | Schad et al. | |
| 2011/0236527 | A1 | 9/2011 | Schad et al. | |
| 2011/0268834 | A1 | 11/2011 | Schad et al. | |
| 2012/0076613 | A1 * | 3/2012 | Ishida | F16B 33/004 |
| | | | | 411/337 |
| 2015/0035273 | A1 * | 2/2015 | Moore | E21B 17/042 |
| | | | | 285/333 |

FOREIGN PATENT DOCUMENTS

| | | |
|---|---|---|
| DE | 2212774 | 10/1972 |
| DE | 44 46 692 | 6/1996 |
| GB | 1388715 | 3/1975 |
| JP | 2004-351896 | 12/2004 |
| JP | 2012-218263 | 11/2012 |
| JP | 2017-189993 | 10/2017 |
| WO | 2010/037236 | 4/2010 |

OTHER PUBLICATIONS

Standard Work, Machine Elements, Chapter 3, "Practical Strength Calculation", Niemann, Winter, Berlin, Germany, 4th Edition, 2016 (with English-language explanation of relevance).
Misumi Corporation."Standard Components for Plastic Mold" Misumi USA [online]. Aug. 2015.

* cited by examiner

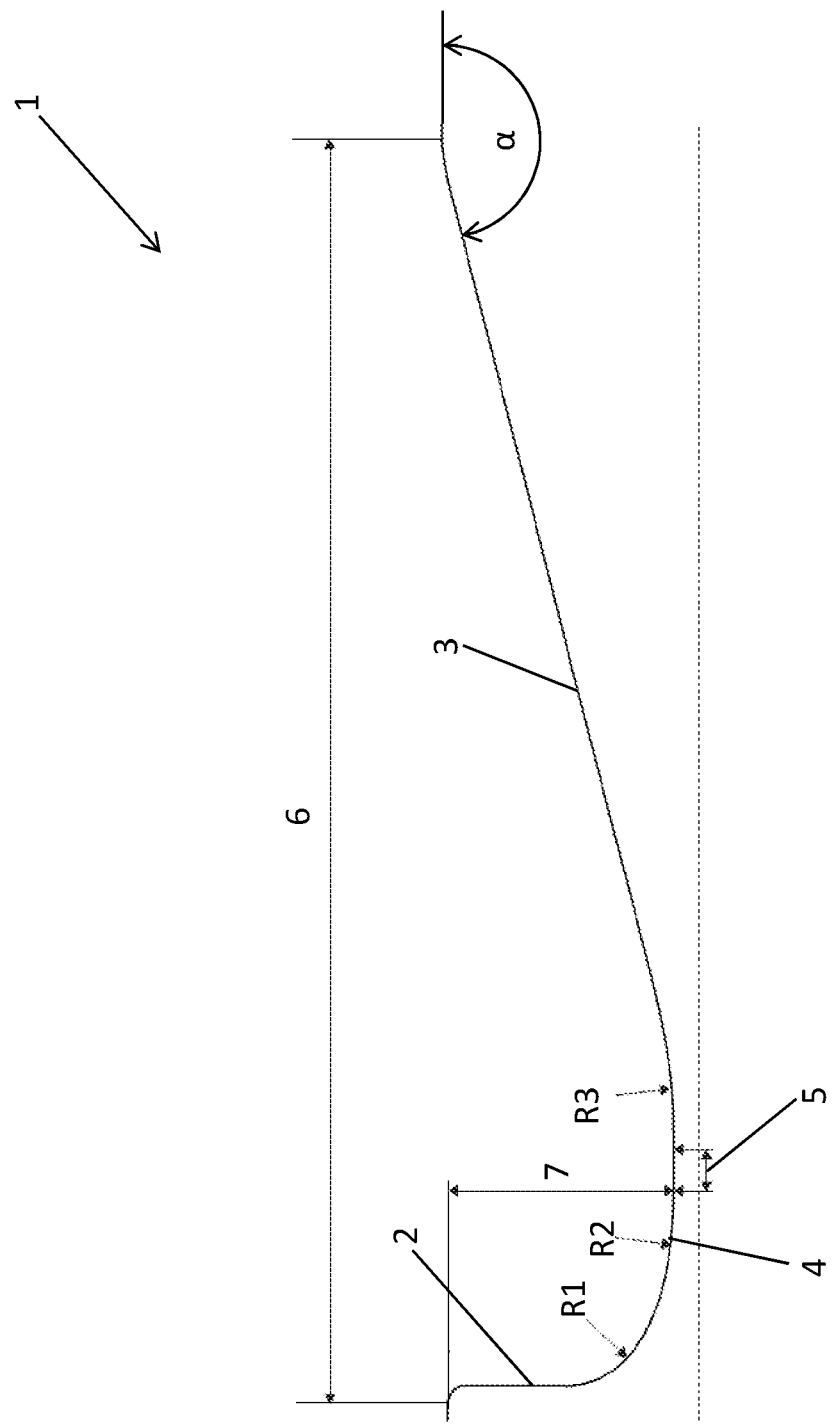

PULL OR PUSH ROD OR A LOCKING NUT FOR A MOLDING MACHINE

BACKGROUND OF THE INVENTION

The invention concerns a pull or push rod or a locking nut for a molding machine with at least one groove, a clamping unit of a molding machine or a molding machine with a clamping unit, and a method of producing a pull or push rod or a locking nut for a molding machine.

Molding machines can be understood as injection molding machines, transfer molding machines, presses or the like.

In the following, the prior art is explained using an example of an injection molding machine.

An injection process typically begins with the closing of the clamping unit, and the movable mold mounting plate is brought to the fixed mold mounting plate by a rapid stroke movement. The movable mold mounting plate is then locked with the pressure-exerting piston part of a clamping mechanism, and the clamping mechanism builds up the clamping force required for the injection process.

In the case of an injection molding machine with a tie bar, the clamping mechanism is often a hydraulic cylinder whose piston exerts a force via the tie bar on the movable mold mounting plate. Also common is the case of an injection molding machine with four tie bars. Here, the clamping mechanism is often designed as a pressure pad between the mold mounting plates or at the ends of the tie bars. These pressure pads are also often designed hydraulically, as high pressures have to be built up in a relatively short time.

So these tie bars are pull rods or push rods. These pull or push rods are fastened, for example, to the fixed mold mounting plate. On the opposite side of the pull or push rod, they are provided with grooves, and the grooves serve to form a positive-locking, releasable connection with a locking nut. Via this locking nut, the grooves apply pulling or compressive forces into the pull or push rod, in order to be able to move the movable mold mounting plate with respect to the fixed mold mounting plate, or to press the two against each other. Such locking nuts are mostly designed as half-shells, which can be brought into a locking position by bringing them together. This serves to enable a rapid stroke drive in the unlocked state of the locking nut to move the movable mold mounting plate with respect to the fixed mold mounting plate at a higher speed. If mold halves mounted on the mold mounting plates (almost) contact each other, the locking nut/s can again be moved into a locking position in order to apply the clamping force by the clamping force mechanism, which has a smaller range of motion and a lower speed, but can apply higher forces.

By applying the clamping force to the movable mold mounting plate, the movable mold mounting plate is pressed to the fixed mold mounting plate by a force in the range of 15 000 kN, for example. With such high clamping forces, the pull or push rod/s must accordingly be solid under high material expenditure. Here the grooves in the pull or push rods represent a notch, and thus form a cross-section with the highest load in the groove cross-section, the related undercuts before or after the grooves, however, are also increased sources of danger. In the case of an unprofessional design, they may form a notch which additionally stress the cross-section of the undercut (the undercut cross-section), and thus forms the cross-section with the highest stress when viewed via the pull or push rod or the locking nut.

SUMMARY OF THE INVENTION

The object of the invention is to produce a pull or push rod or a locking nut for a molding machine with an undercut, which has an increased strength with essentially the same material expenditure. In other words, the pull or push rod should be improved in such a way that the material expenditure is reduced while the strength remains essentially the same. In this way, the available space for construction between the pull or push rods can be increased by increasing the clearance between two or more pull or push rods (by reducing their diameter). The diameter of the pull or push rod is kept as small as possible.

This object is solved by a pull or push rod or a locking nut for a molding machine with at least one undercut, a clamping unit of a molding machine or a molding machine with a clamping unit, and a method for producing a pull or push rod or a locking nut for a molding machine.

A pull or push rod or locking nut according to the invention for a molding machine with at least one undercut has at least one undercut cross-section, a side wall, and an undercut ramp. The side wall transitions into an undercut base via at least one first transition curvature, and the undercut base transitions into the undercut ramp via at least one second transition curvature. The undercut base, viewed in the undercut cross-section, is formed at least partially as a curvature, and the curvature of the undercut base differs from the at least one first transition curvature and/or the at least one second transition curvature. When designing the cross-section of the undercut, a relatively small depth of the undercut and relatively large curvatures for the transitions of the side walls and the undercut ramp into the undercut base can be achieved at the same time by the invention, which are contradictory requirements in themselves.

The reduced depth reduces the influence of the notch, which the at least one undercut represents. The curvatures reduce the notch effect. Overall, under the influence of the clamping force on the pull or push rod in the area of the at least one undercut, there are reduced stresses. This allows material to be saved and/or higher strengths to be achieved.

In general, details about geometric dimensions and ratios in this disclosure are to be understood as dimensions and ratios in a non-deformed state (without application of force). In other words, the mentioned dimensions and ratios could also be referred to as manufacturing data. Depending on the material used and the force applied to the components, elastic and partly plastic deformations will occur during operation, wherein these deformations lead to changes in dimensions and ratios.

In the present disclosure, the formulation "that a first quantity X stands in relation to a second quantity Y in a ratio of Z" is to be understood as "X:Y=Z".

Accordingly, the formulation "that a first quantity X stands in relation to a second quantity Y in a ratio from $Z_1$ to $Z_2$" is to be understood as a range for which "X:Y=$Z_1$ to X:Y=$Z_2$" applies.

The pull or push rod may be solidly in the form of a solid rod or also as a tube. In addition, the curvature of the undercut base may differ only from at least one curvature of the transition curvatures, or from several or all curvatures of the transition curvatures.

Preferably, the at least one undercut is completely or only partially circumferential on the pull or push rod or the locking nut. For example, in a possible embodiment, the at least one undercut may be formed circumferentially on a rotationally symmetrical base body. However, the at least one undercut can cut through a pull or push rod one-sided and straight-lined only.

Advantageously, the side wall can have an angle of 70° to 110°, preferably 80° to 100°, with respect to a surface of the pull or push rod or a surface of an imaginary core hole of the locking nut. Preferably, this angle is 90° or rectangular to the surface.

Particularly preferably, the at least one first or the at least one second transition curvature transitions tangentially into the undercut base, preferably transitions tangentially into the curvature of the undercut base. A tangent here is to be understood as an imaginary straight line at the point of transition normal to the imaginary line of the transition point to the center point of the curvature. This straight line in turn forms the tangent, which is normal to the imaginary straight line of the transition point of the curvature of the undercut base and the center point.

In another preferred embodiment, between the at least one first transition curvature and/or the at least one second transition curvature and the undercut base, a straight section can be provided, viewed in the undercut cross-section. In other words, there is a straight section between the first transition curvature and the undercut base, and/or between the second transition curvature and the undercut base.

Preferably, the undercut ramp, viewed in the undercut cross-section, is straight-lined and has an angle of 175° to 150°, preferably 170° to 160°, and particularly preferably 165°, with respect to a surface of the pull or push rod or a surface of an imaginary core hole of the locking nut.

In a possible embodiment, a radius of an imaginary curvature circle at at least one point of the curvature of the undercut of a radius of an imaginary curvature circle at at least one point of the at least one first transition curvature, and/or of an imaginary curvature circle at at least one point of the at least one second transition curvature, has a different, finite value other than zero.

Preferably, the at least one first transition curvature is a first transition radius, and the at least one second transition curvature is a second transition radius. Preferably, the at least one second transition radius is in a ratio of 20 to 2, preferably in a ratio of 7 to 4, particularly preferably in a ratio of 5.5, to the at least one first transition radius.

Preferably, the curvature of the undercut base may be formed as a radius. In this case, the value of the radius of the undercut base can be in a ratio of 10 to 1, preferably in a ratio of 5 to 2, particularly preferably in a ratio of 3.6, to the at least one first transition radius. The applicant's tests have shown that the provision of a larger radius of the undercut base with respect to the first transition radius of the side wall evokes an optimum force initiation or optimum force flux in the pull or push rod or the locking nut.

The radius respectively the transition radius is here to be understood in such a way that the transition, viewed in cross-section, is a circular arc which has a radius. It is also possible to have several radii in a row.

Particularly preferably, the pull or push rod has a rotationally symmetrical base body.

Also, a clamping unit of a molding machine or for a molding machine with a clamping unit can include at least one locking nut according to the invention, and/or at least one pull or push rod according to the invention.

In addition, a process for producing a pull or push rod or a locking nut for a molding machine, includes at least the following steps:
specification of a desired pulling or compressive force which is transferable non-destructively by the pull or push rod or the locking nut
selection of a suitable material for the pull or push rod or the locking nut
specification of a suitable undercut geometry, wherein the at least one undercut has an undercut cross-section, a side wall and an undercut ramp, wherein the side wall transitions into an undercut base via at least one first transition curvature, and the undercut base transitions into the undercut ramp via at least one second transition curvature, wherein the undercut base, viewed in the undercut cross-section, is at least partially curved, wherein the curvature of the undercut base differs from the at least first and/or the at least second transition curvature,
specification of the minimum diameter of the pull or push rod or locking nut resulting from the desired pull or push rod or locking nut, the desired material and the specified undercut geometry
manufacturing of the pull or push rod or locking nut with the specified diameter and the specified undercut geometry from the defined material.

By a non-destructive transmission of the pulling or compressive forces by a pull or compression rod or a locking nut, it is here to be understood that there is not only a transmission of the forces, wherein no failure of the push or pull rod or the locking nut occurs, but also a transmission, wherein no permanent or plastic deformation of the push or pull rod or the locking nut occurs. Preferably, a fatigue strength of the pull or push rod or the locking nut can also be understood here.

Preferably, for the specification of a suitable undercut geometry, a cross-sectional notch of the pull or push rod or the locking nut, separate from the undercut, is considered. Thus, the depth of the undercut can align with an already existing cross-sectional notch. The size or length of the undercut can also vary through this. A cross-sectional notch can be understood as a groove on a surface of a pull or push rod, or on a surface of a locking nut. Also tapered cross-sections, which have an edge, can be regarded, for example, as such cross-sectional notches.

Preferably, the pull or push rod or locking nut is subjected to a coating process. By such a coating process, the surface of a tie rod, push rod or locking nut can be prepared for use during manufacture. In this way, the surface can be protected against corrosion, or, for example, made more robust against damage such as scratches. In addition, a foreign material can be applied to a base material by build-up welding.

Preferably, the pull or push rod or locking nut can be subjected to a process to change the material properties. Thus, a process such as nitriding or the use of alloys is referred to here purely as an example.

The pull or push rod or the locking nut can be produced by a forming process. Thus, it may be advantageous in an exemplary embodiment if the pull or push rod or the locking nut is manufactured by a forging process. Deep rolling, ball bombardment, or needling can also give the surface of the pull or push rod or locking nut particularly favorable hardness and strength properties. This/these treatment(s) can be carried out at different temperatures (e.g. ambient temperature or workpiece temperature).

Preferably, the pull or push rod or locking nut is manufactured by a machining process.

So, for example, a previously machined workpiece (which, for example, was cast) can be brought to an oversize (final dimension/final shape plus a small tolerance upwards) by a machining process (such as for example turning). In a further step, this exemplary workpiece can be subjected to a surface treatment process, in which the surface layers of the workpiece are hardened either by nitriding and/or hardening and/or a plastically deforming process. In a further step, the workpiece can then be brought to its final dimension by a machining process (such as turning or grinding). In addition, a coating process can also be carried out in order to increase the product life of the workpiece or the product life of the meanwhile resulting pull or push rod or locking nut.

BRIEF DESCRIPTION OF THE DRAWING

Different embodiments of the invention will be explained with the help of the drawing and the corresponding drawing description. Therein, FIG. 1 shows a purely exemplary embodiment of a pull or push rod or locking nut according to the invention with an undercut.

DETAILED DESCRIPTION OF THE INVENTION

FIG. 1 shows a partial view of a pull or push rod or locking nut according to the invention with an undercut 1 in cross-section (in undercut cross-section). The undercut 1 is formed by a side wall 2, an undercut base 4, and an undercut ramp 3. Here the side wall 2 transitions tangentially into a first transition curvature (in this embodiment shown as transition radius R1), which in turn transitions tangentially into the curvature of the undercut base 4 (which in this embodiment is designated the radius R2). The undercut base 4 or the radius R2 transitions tangentially into the second transition. This second transition is hereby designed two-part. First, by a straight-lined section 5, which is directly adjacent to the undercut base 4, which in turn transitions tangentially into the transition curvature (shown here as transition radius R3), which connects the straight-lined undercut ramp 3 tangentially. The undercut ramp 3 is inclined at an angle α to the surface of the pull or push rod or to the surface of an imaginary core hole of the locking nut. The entire undercut has an undercut length 6 and an undercut depth 7. This undercut depth 7 and undercut length 6 can be varied depending on the area of application and loads.

This FIGURE shows clearly that the design of the undercut base 4 as radius R2 allows for a reduction of the notch effect by the transition radii without this causing a significant deepening of the undercut 1.

LIST OF REFERENCE SIGNS 1 undercut
2 side wall
3 undercut ramp
4 undercut base
5 straight-lined section
6 undercut length
7 undercut depth
R1 transition radius
R2 radius
R3 transition radius
α angle

The invention claimed is:

1. A pull or push rod or locking nut for a molding machine, the pull or push rod or locking nut having at least one undercut, wherein the at least one undercut has:
an undercut cross-section;
a side wall; and
an undercut ramp,
wherein the at least one undercut is configured such that the side wall transitions via at least one first transition curvature into an undercut base, and the undercut base transitions via at least one second transition curvature into the undercut ramp,
wherein the undercut base, viewed in the undercut cross-section, is at least partially curved, and
wherein a curvature of the undercut base differs from the at least one first transition curvature and/or the at least one second transition curvature.

2. The pull or push rod or locking nut according to claim 1, wherein the at least one undercut is formed completely or partially circumferentially on the pull or push rod or locking nut.

3. The pull or push rod or locking nut according to claim 1, wherein the side wall has an angle in a range of 70 degrees to 110 degrees with respect to a surface of the pull or push rod or a surface of an imaginary core hole of the locking nut.

4. The pull or push rod or locking nut according to claim 3, wherein the side wall has an angle in a range of 80 degrees to 100 degrees with respect to a surface of the pull or push rod or a surface of an imaginary core hole of the locking nut.

5. The pull or push rod or locking nut according to claim 4, wherein the side wall has an angle of 90 degrees with respect to a surface of the pull or push rod or a surface of an imaginary core hole of the locking nut.

6. The pull or push rod or locking nut according to claim 1, wherein the at least one first or the at least one second transition curvature transitions tangentially into the undercut base.

7. The pull or push rod or locking nut according to claim 6, wherein the at least one first or the at least one second transition curvature transitions tangentially into the curvature of the undercut base.

8. The pull or push rod or locking nut according to claim 1, wherein the at least one undercut includes a straight-lined section between (i) the at least one first transition curvature and the undercut base and/or (ii) the at least one second transition curvature and the undercut base, as viewed in the undercut cross-section.

9. The pull or push rod or locking nut according to claim 1, wherein the undercut ramp, viewed in the undercut cross-section, is straight-lined, and has an angle (α) with respect to a surface of the pull or push rod or with respect to a surface of an imaginary core hole of the locking nut, the angle being in a range of 175 to 150 degrees.

10. The pull or push rod or locking nut according to claim 9, wherein the angle is in a range of 170 degrees to 160 degrees.

11. The pull or push rod or locking nut according to claim 1, wherein a radius of an imaginary curvature circle at at least one point of the curvature of the undercut base has a finite value greater than zero, the radius of the imaginary curvature circle at at least one point of the curvature of the undercut base differing from (i) a radius of an imaginary curvature circle at at least one point of the at least one first transition curvature and/or from (ii) an imaginary curvature circle at at least one point of the at least one second transition curvature.

12. The pull or push rod or locking nut according to claim 1, wherein the at least one first transition curvature is a first transition radius, and the at least one second transition curvature is a second transition radius.

13. The pull or push rod or locking nut according to claim 12, wherein the value of the radius of the undercut base is in a ratio to the at least one first transition radius of 10 to 1.

14. The pull or push rod or locking nut according to claim 13, wherein the value of the radius of the undercut base is in a ratio to the at least one first transition radius of 5 to 2.

15. The pull or push rod or locking nut according to claim 1, wherein the at least one second transition radius is in a ratio of 20 to 2 with respect to the at least one first transition radius.

16. The pull or push rod or locking nut according to claim 15, wherein the at least one second transition radius is in a ratio of 7 to 4 with respect to the at least one first transition radius.

17. The pull or push rod or locking nut according to claim 1, wherein the curvature of the undercut base is a radius.

18. The pull or push rod according to claim 1, wherein the pull or push rod has a rotationally symmetrical base body.

19. A clamping unit of a molding machine or molding machine having a clamping unit with the pull or push rod or locking nut according to claim 1.

20. A method for producing a pull or push rod or a locking nut for a molding machine, comprising at least the following steps:
- specifying a desired pulling or compressive force which is transferable non-destructively by the pull or push rod or the locking nut;
- selecting a suitable material for the pull or push rod or the locking nut;
- specifying a suitable undercut geometry for at least one undercut of the pull or push rod or the locking nut, wherein the at least one undercut has an undercut cross-section, a side wall, and an undercut ramp, wherein the at least one undercut is configured such that the side wall transitions into an undercut base via at least one first transition curvature, and the undercut base transitions into the undercut ramp via at least one second transition curvature, wherein the undercut base, viewed in the undercut cross-section, is at least partially curved, and wherein a curvature of the undercut base differs from the at least first transition curvature and/or the at least second transition curvature;
- specifying a minimum diameter of the pull or push rod or locking nut resulting from a desired pull or push rod or locking nut, a desired material, and the specified suitable undercut geometry; and
- manufacturing the pull or push rod or the locking nut with the specified minimum diameter and the specified suitable undercut geometry from the specified material.

21. The method for producing a pull or push rod or locking nut for a molding machine according to claim 20, wherein determining a suitable undercut geometry includes taking into account a cross-section notch, separate from the undercut, of the pull or push rod or the locking nut.

22. The method for producing a pull or push rod or locking nut for a molding machine according to claim 20, further comprising subjecting the pull or push rod or locking nut to a coating process.

23. The method for producing a pull or push rod or locking nut for a molding machine according to claim 20, further comprising subjecting the pull or push rod or locking nut to a method for changing the material properties.

24. The method for producing a pull or push rod or locking nut for a molding machine according to claim 20, wherein the manufacturing of the pull or push rod or locking nut includes producing the pull or push rod or locking nut by a forming process.

25. The method for producing a pull or push rod or locking nut for a molding machine according to claim 20, wherein the manufacturing of the pull or push rod or locking nut includes producing the pull or push rod or locking nut by a machining process.

* * * * *